Nov. 18, 1924.
B. T. WILLISTON
1,516,368
CHECK VALVE
Filed Sept. 8, 1920
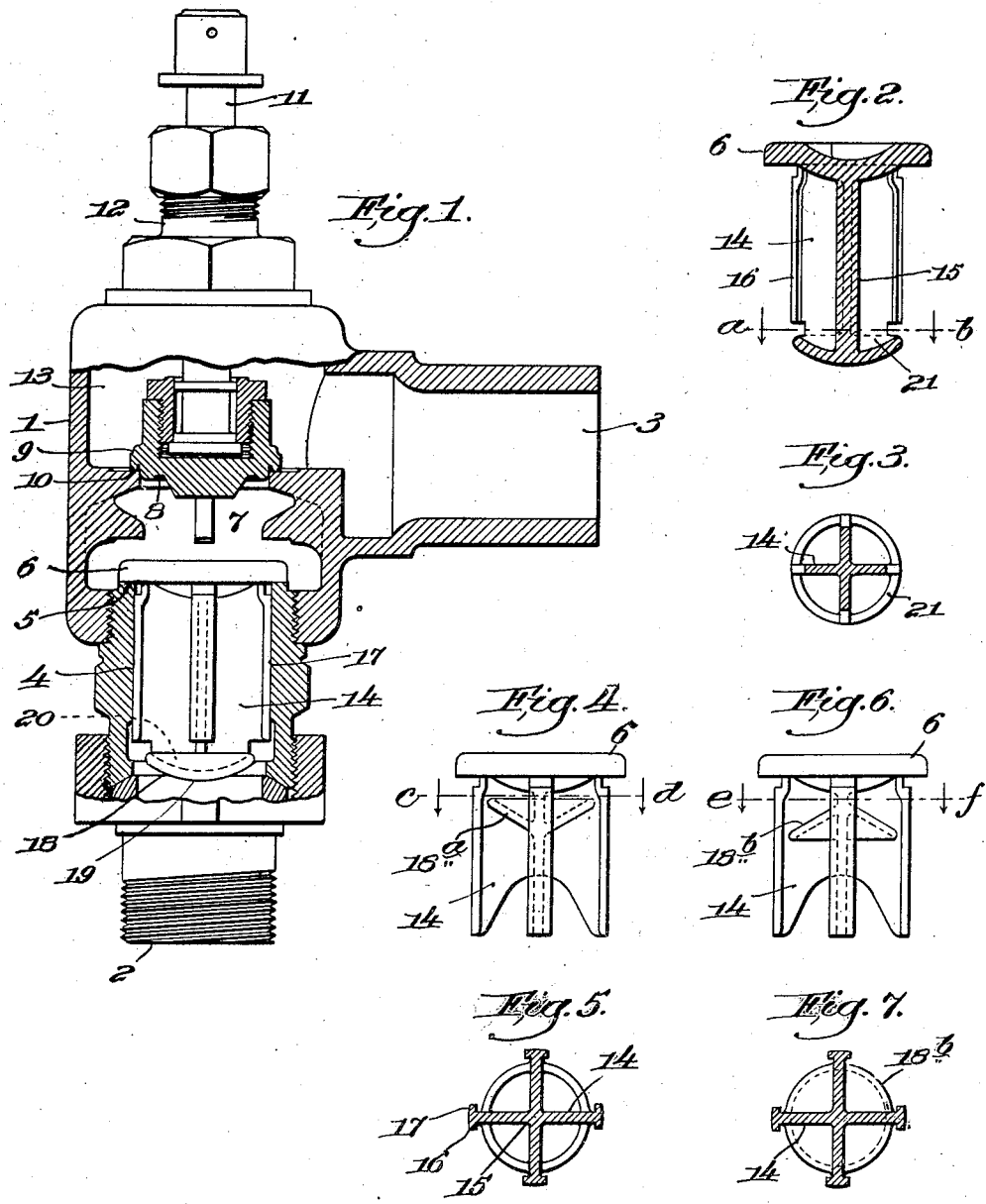
Inventor:
Belvin T. Williston,
by Roberts, Roberts & Cushman
his Attys.

Patented Nov. 18, 1924.

1,516,368

UNITED STATES PATENT OFFICE.

BELVIN T. WILLISTON, OF SOMERVILLE, MASSACHUSETTS, ASSIGNOR TO MANNING, MAXWELL & MOORE, INC., OF NEW YORK, N. Y., A CORPORATION OF NEW JERSEY.

CHECK VALVE.

Application filed September 8, 1920. Serial No. 408,842.

*To all whom it may concern:*

Be it known that I, BELVIN T. WILLISTON, a citizen of the United States of America, and resident of Somerville, in the county of Middlesex and State of Massachusetts, have invented new and useful Improvements in Check Valves, of which the following is a specification.

This invention relates to check valves of that type in which a movable valve element is actuated by fluid pressure for opening and closing same and more particularly to valves such as are employed at intermediate points in pipe lines through which fluid may be caused to flow under or against a pressure head, and in which the flow of fluid may be intermitted.

In such pressure pipe lines, it frequently happens that the flow of fluid is interrupted quite suddenly, either by the rapid closing of a valve therein, or by the shutting down of the fluid propelling means. When a check valve of ordinary construction is located at an intermediate point in such a pipe line it is found upon the sudden cessation of fluid flow, that such a valve in many instances fails to close with sufficient promptness to prevent a reversal of flow along the pipe under operation of the pressure head against which the fluid was being propelled, and such reversal produces a destructive water hammer effect upon all parts connected with the pipe line.

While the valve of the present invention is of general utility wherever the condition above described exist, and while it is entirely independent of the means by which the fluid is caused to flow along the pipe line and which means may comprise the force of gravity or high fluid pressure, as well as mechanically driven pumps, and thermodynamic pumps including injectors and inspirators,—as a particular instance of the employment of such a check valve may be mentioned that occurring in locomotive practice. It is common in the latter case to locate the injector, inspirator, or other feed water pump adjacent and in many cases below the floor of the cab. From this point a pipe line extends in a forward direction to a point near the front of the boiler. In this pipe line adjacent the injector or inspirator is usually placed a check valve, termed the "line check valve" and at the point where the pipe line enters the boiler is placed a second check valve known as the "boiler check valve." This latter check valve commonly comprises a casing providing a substantially horizontal valve seat and a valve disc movable in the casing toward and from the seat, such valve being lifted by the feed water as the latter flows through the pipe line, whereby the water is permitted to enter the boiler. This valve disc is intended to be closed by its own weight, acting in conjunction with the boiler pressure. As heretofore constructed, however, the boiler check valve frequently fails to operate in a satisfactory manner upon shutting off of the injector or inspirator. This imperfect action of the valve permits the full boiler pressure to act for a short period on the pipe line, driving a slug of water in a reverse direction therealong, such water acting with a powerful hammer effect upon the line check valve, the blow caused by this water hammer frequently causing damage to the line check valve, its connection to the pump, or to the pump itself.

The object of the present invention is to overcome the defects of operation of the boiler check valve as commonly constructed, whereby to cause such valve to close positively and substantially instantaneously upon shutting off of the injector or inspirator, whereby any possible reversal of flow through the pipe line is precluded and thus the injurious effects of water hammer at the line check valve are eliminated.

To this end the main valve disc of the boiler check valve may be provided with means arranged to be acted upon by fluid flowing in the reverse direction through the valve casing, whereby the fluid serves in a positive manner to bring the main valve member to its seat. Such fluid actuated element may comprise a disc-like member constituting in effect an auxiliary valve head, such a member being spaced in the direction of fluid flow from the main valve head but preferably being of a diameter substantially smaller than that of the main valve head, whereby to permit the flow of fluid in a normal direction thereby. This auxiliary head, while preferably of disc-shape and if desired somewhat dished at its edges, may if desired be so deeply dished as to comprise a substantially conical cup having its peripheral surface inclined either in the direction of normal fluid flow or in a reverse direction.

A preferred form of the invention is disclosed in the accompanying drawings in which:

Figure 1 is a side elevation of the valve casing with parts thereof broken away to show the interior construction with the movable valve element therein.

Figure 2 is a longitudinal cross section of the movable check valve element removed from the casing.

Figure 3 is a transverse cross section of the device shown in Fig. 2 on the line a—b.

Figure 4 is an elevation of a movable check valve element of modified form in which the actuating member thereof is located adjacent the main valve head.

Figure 5 is a transverse cross section of the device shown in Fig. 4 on the line c—d thereof.

Figure 6 is a view similar to Fig. 4 showing a further modification; and

Figure 7 is a transverse cross section on the line e—f of Fig. 6.

1 is a casing within which the valve parts are mounted said casing having an inlet at 2 and an outlet at 3. Extending between the inlet and outlet is a channel for the passage of fluid, a portion of such channel as at 4 being substantially cylindrical. The cylindrical portion of the channel ends at 5 in a circular valve seat, cooperating with which is a valve head 6 of substantially disc form and which serves when in engagement with the seat 5 to prevent passage of fluid in a reverse direction through the casing, that is to say in a direction from the outlet 3 toward the inlet 2. Above the cylindrical channel 4 is an enlargement 7 within which the head 6 may move, the channel being continued above such enlargement by a substantially circular passage 8 of smaller diameter. 9 is a stop valve adapted to engage a seat 10 surrounding the circular opening 8, said stop valve being connected to a stem 11 passing through a stuffing box 12 of usual construction. Above the valve seat 10 is a chamber 13 communicating with the enlarged opening 7 by means of the circular passage 8, this chamber 13 opening into the outlet passage 3. In the normal operation of the device the stop valve 9 is moved away from its seat 10 by operation of its stem 11 in any suitable manner, this valve being only employed for shutting off the chamber 7 from the outlet passage when for any reason it is desired to relieve the fluid pressure in the inlet passage.

Projecting downwardly from the lower face of the disc 6 and secured thereto in any desired manner, as for instance by integral connection therewith, are a plurality of guide fins 14. As herein shown four such fins are employed, though the exact number is not essential, such fins as herein shown being united integrally at their inner edges as at 15. The outer ends of the fins are provided with enlarged heads 16 having outer faces 17 adapted to engage the inner wall of the cylindrical passageway 4. These fins thus serve to guide the valve disc 6 in its movements toward and from its seat. 18 is an auxiliary valve head, substantially circular in shape and if desired of dished formation although a flat disc-like head may be employed if desired. As shown in Fig. 1, this head is convex on its lower face 19 and concave on its upper face 20. The upper face of said auxiliary head is connected to the lower ends 21 of the fins 14 either integrally or in other desired manner. The main valve disc 6 with the fins 14 and the auxiliary head 18 thus form a unitary structure movable longitudinally in the valve casing. As a modification of the device shown in Fig. 1 the movable valve element as disclosed in Fig. 4 may have the auxiliary head 18$^a$ located at a point much nearer the head 6 than shown in the device of Figs. 1 and 2. Such auxiliary head as disclosed in Fig. 4 may if desired be so deeply dished as to be substantially conical in shape, the apex of the cone pointing away from the head 6 and in a direction opposite to the normal flow of fluid through the casing. In this arrangement the auxiliary head 18$^a$ may be considered as divided into sectors the edges of which are connected integrally to the adjacent fins, as clearly seen in Fig. 5. As a further modification, the arrangement shown in Fig. 6 may be employed in which the auxiliary head 18$^b$ is located substantially as shown in Fig. 4 except that the apex of the cone points toward the main head 6 and in the direction of normal flow of fluid through the casing.

In Fig. 1 the stop valve 9 is closed, but in normal operation of the device this valve would be fully open. Upon admission of fluid through the inlet opening 2 such fluid will pass around the auxiliary head 18 which is of somewhat smaller diameter than the passage 4 and between the fins 14 along the passage 4 until it exerts pressure against the under side of the head 6. The head 6 will then be lifted with its connecting parts, floating upon the stream of fluid passing through the casing, the fluid then passing through the chamber 7, the opening 8, and the chamber 13 to the outlet 3. The check valve head 6 maintains this position during the normal operation of the inspirator or other device employed for forcing water through the casing, but upon shutting off of the water supply the head 6 tends to drop by its own weight against the seat 5 thus preventing the reversal of flow of fluid through the casing. If for any reason the valve disc 6 should fail to become seated in the proper manner, fluid would be permitted to flow in a reverse direction through the casing, but by the provision of the auxiliary head 18, such fluid flowing through the passage 4 serves, by engagement with said head 18, in a positive manner to drag the head 6 down against its seat. The upwardly concave arrangement of the auxiliary head is found to be quite desirable in obtaining rapid closing of the valve 6 as it presents a surface of a form well adapted for the moving fluid to react against, whereby to derive the necessary energy from such fluid to enable it to forcibly move the valve 6 against its seat. In the modified form shown in Fig. 4 the auxiliary head $18^a$ is located much nearer to the main head 6 with the object of securing more rapid effects in closing the main valve upon reversal of the flow in the casing. The modification shown in Fig. 6 while theoretically not as efficient in most cases as that disclosed in Figs. 1 and 4, is found under certain circumstances to be desirable.

I claim:

1. A check valve device comprising a casing having a channel and a valve seat concentric therewith, a valve having a head co-operable with said seat, a plurality of spaced guide fins extending from one side of the head and slidably engaging the walls of the channel, and a disc-like member secured to said fins, said member being of a diameter smaller than that of the head but nearly equaling that of the channel whereby back pressure in the channel will act against the disk to assist in closing the valve.

2. A check valve device comprising a movable valve member having a disc-like head, guide elements fixedly secured to the head and extending substantially perpendicular to one side thereof, and an auxiliary head of dished formation secured to said guide elements, the concavity of such auxiliary head being directed toward the main head.

3. In a check valve device, in combination a casing providing a valve seat, a valve disc movable toward and from said seat, a plurality of spaced guide lugs or fins secured to the seat engaging face of said disc and extending substantially axially of said casing, and a valve actuating head spaced from said valve disc and secured directly to the ends of said guide lugs, said valve actuating head being free from engagement with said casing and having a fluid reacting surface opposed to the seating surface of the valve whereby pressure against said face will operate to seat the valve.

Signed by me at Boston, Massachusetts, this 25th day of August, 1920.

BELVIN T. WILLISTON.